INVENTOR
Thomas Castillo

3,311,174
PROCESS OF TREATING NYLON RACE TYPE HORSESHOES
Thomas Castillo, New Orleans, La., assignor to Balanz Racing Plate Corporation, New Orleans, La., a corporation of Louisiana
Filed Apr. 14, 1965, Ser. No. 448,912
2 Claims. (Cl. 168—24)

This invention relates to a moisturized nylon horse shoe and the process or method for making the same.

A principal object of the invention is the provision of a proper flexible race horse shoe.

Another object of the invention is the provision of a flexible race horse shoe that will move in the proper timing with all motions of the horse's feet.

A further object of the invention is to eliminate improper flexible race horse shoes which are not in proper timing with the horse's feet.

The following specific example will serve to illustrate proper timing or proper flexibility.

*Example*

If the nylon horse shoes are not moisturized, they will not be properly flexible, and if they are not properly flexible, they will not be in proper timing with the movement of the race horse's feet, and if they are not in proper timing with the horse's feet movement, they will over spread the horse's feet, which will cause the horse to slow down in the race or may cause him to fall down, causing injuries.

The process method for making moisturized nylon horse shoes properly flexible is as follows:

After the manufacturing of all nylon horse shoes from hard 66 nylon super polyamide powder, the nylon horse shoes are immersed in boiling brine or salt water for 24 hours, and as the result of this process the shoes are moisturized. Then the nylon horse shoes are removed from the boiling process and made ready for market.

The following specific drawing will serve to show the proper flexibility of the moisturized nylon horse shoe:

Figure 1:
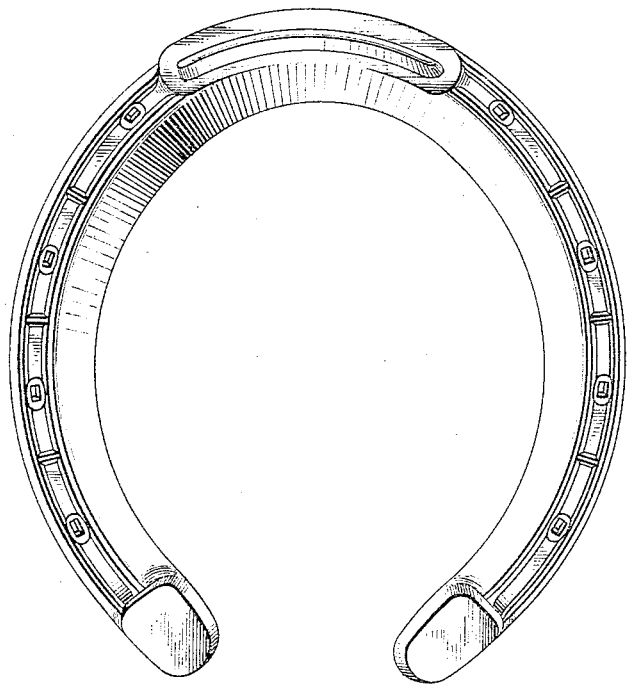
FIG. 1 shows the moisturized nylon horse shoe, in its normal shape.
Figure 2:
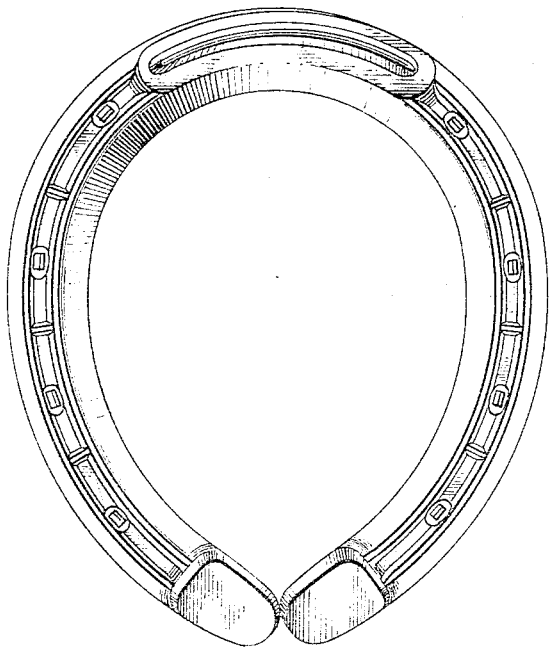
FIG. 2 shows the flexibility of the moisturized nylon horse shoe, after it has been moisturized so it can be hand shaped into any form without the use of a hammer.

The moisturized nylon horse shoe of the invention has a great advantage over the prior known unmoisturized nylon horse shoes, due to the fact that its proper flexibility keeps the shoes in proper timing with the horse's feet when horse is racing, while in unmoisturized nylon horse shoes proper timing with the horse's feet is impossible to obtain.

While a preferred embodiment of the discovery has been disclosed, the improvement therein is not to be construed as to the form or design of the shoe, but is limited to the improvement therein, thus claiming only what is new in horse shoes.

I claim:
1. The method of producing a flexible horseshoe fabricated of nylon comprising the steps of placing the shoe in a solution of brine, raising the temperature to the boiling point and maintaining the boiling temperature for 24 hours.
2. The process of moisturizing a nylon horseshoe comprising the step of boiling the shoe in a salt water solution for at least 24 hours.

References Cited by the Examiner
UNITED STATES PATENTS

| | | | |
|---|---|---|---|
| 2,197,166 | 4/1940 | Wheeler et al. | 168—4 |
| 3,050,133 | 8/1962 | Ketner et al. | 168—4 |

SAMUEL KOREN, *Primary Examiner.*

ALDRICH F. MEDBERY, *Examiner.*